Patented Apr. 9, 1946

2,398,049

UNITED STATES PATENT OFFICE 2,398,049

LINING MATERIALS

George Schneider, Montclair, N. J., and Mervin E. Martin, Cumberland, Md., assignors to Celanese Corporation of America, a corporation of Delaware No Drawing. Application November 12, 1941, Serial No. 418,860

1 Claim. (Cl. 106—122)

This invention relates to the preparation of resilient materials and relates more particularly to the production of resilient materials suitable for use as cushion liners in closures, such as those employed in the bottling industry.

An object of our invention is the preparation of resilient materials suitable for lining bottle closures and the like which are economical and highly efficient.

Another object of our invention is the preparation of artificial lining materials for bottle closures and the like which possess great flexibility as well as unusual resiliency.

Still another object of our invention is the preparation of lining materials for closures which materials are capable of maintaining an effective seal over wide fluctuations in the temperature and internal pressure of the contents of the containers on which they are applied.

Other objects of our invention will appear from the following detailed description.

Closures of various types are employed in sealing containers of glass or metal which are used for holding liquids. In the case of carbonated beverages, such as soft drinks, beer, etc., where it is important to retain the gas in solution, the closures are usually in the form of a metal cap or shell lined with a disc of some soft, easily deformable material which may be covered with a flexible metal foil. The closures are put on the filled bottles by a suitable capping device which serves to bend the edges of the metal closure beneath a lip provided at the top of the bottle and to force the soft, foil-covered disc against the upper or pouring edge of the bottle. The pressure of the disc against the bottle acts as a seal and serves to prevent the escape of either the gas or the liquid. Ordinarily, the soft disc is formed of a material such as cork, but the quality and availability of this material varies from time to time. For this reason, a suitable material having the physical advantages of cork but which is readily available and whose quality can be controlled has long been sought.

We have now discovered that lining materials of great flexibility and resiliency, which are suitable for use as cushion liners for closures and capable of maintaining an effective seal when in use, may be prepared from regenerated cellulose materials. In accordance with our invention, particles of a regenerated cellulose material of any suitable size are mixed with a hygroscopic material and a suitable binder, and the mixture is then compressed under elevated pressure. The action of the elevated pressure in the presence of the binder causes the particles to be firmly united, and the resulting product is a soft, compact and flexible material which is highly resilient. Discs of this material, used alone or faced with a thin film or foil of suitable inert material to prevent contamination of or reaction with the contents of the container being sealed, may be used as cushion liners for container closures to give a gas- and liquid-tight seal which remains tight through wide fluctuations in both the temperature and internal gas pressure of the container. Films or foils having a basis of a derivative of cellulose such as cellulose acetate or ethyl cellulose, and preferably unplasticized, are satisfactory for facing the lining material, but any other equivalent material may be used.

The regenerated cellulose materials which may be employed in forming the lining materials of our invention may be regenerated cellulose obtained by the neutralization of viscose solutions or the regenerated cellulose may be prepared by the saponification of materials having a basis of an ester of cellulose. While the regenerated cellulose may be obtained in either manner, the most desirable results are achieved when employing regenerated cellulose materials which are obtained when particles of an ester of cellulose of any suitable size are saponified by treatment in a suitable saponifying bath. Examples of the cellulose esters which may be saponified to produce the regenerated cellulose materials employed in forming the lining materials of our invention are cellulose organic esters, such as cellulose acetate, cellulose propionate, cellulose butyrate, mixed organic esters such as cellulose acetate-propionate and cellulose acetate-butyrate and inorganic esters such as cellulose nitrate. Mixtures of one or more of the above cellulose esters may also be employed and the cellulose esters may be of any degree of acylation. While any of these esters may be employed, our invention will be more particularly described in connection with the use of cellulose acetate, the ester which is most important commercially.

The cellulose acetate may be saponified in any suitable saponifying medium. Conveniently, the saponification may be carried out by treating the cellulose acetate with inorganic saponifying agents such as sodium hydroxide, potassium hydroxide, sodium silicate, barium hydroxide, ammonium hydroxide and sodium carbonate, or the saponification may be carried out by means of organic saponifying agents such as, for example, methyl amine, ethylene diamine, triethanolamine or other organic base. The saponifying agents may be applied either in aqueous solutions or, when soluble, in alcoholic solutions. Highly satisfactory results are obtained when the saponifying agents are employed in concentrations of from 2 to 20% and the desired degree of saponification may be attained in from 1 to 3 hours while maintaining the temperature of the solutions of the saponifying agents at from 50 to 100° C. In carrying out the process of our invention, the cellulose acetate may, if desired, be completely saponified or substantially completely saponified so that when the saponification is completed the acetyl value of the material will be no more than about 3% (calculated as acetic acid), but in some instances the acetyl value may be permitted to remain as high as 30%. The reduction in acetyl value should, however, be carried to the point where the thermoplastic character of the original cellulose acetate is substantially lost.

The speed with which the cellulose is regenerated depends in some measure on the size of the particles which are undergoing saponification. Generally, cellulose esters ground to 10 to 40 mesh have been found to be suitable, but we preferably employ the cellulose esters when the particle size is from about 20 to 30 mesh. While the cellulose esters may be prepared in the usual way, dried, and then ground, said esters may first be subjected to a treatment adapted to give the cellulose ester particles a cellular structure before being ground and saponified. The latter treatment comprises adding to the cellulose ester, in finely-divided form, a volatile liquid which has in the vapor state at least a solvent, swelling or softening action thereon and then subjecting the treated material to elevated temperature and pressure in a closed chamber. After the cellulose ester is at least partially converted, the pressure is suddenly released and the liquid therein vaporizes, causing the material to expand and giving the ester a cellular structure. This material may be ground to the desired fineness and then saponified.

In forming the cushion liner discs of our invention, we have found that the proper moisture content of the material forming the disc is an important factor in determining the efficiency of the seal. To maintain the moisture content of the cushion liner disc at the proper level, we have found it advantageous to incorporate a suitable hygroscopic material with the regenerated cellulose particles. The hygroscopic material may be added before or after molding or shaping, but it is preferably incorporated in the lining material after molding, shaping or otherwise processing. This is particularly true when elevated pressures and/or temperatures are employed in processing, since under these conditions there is usually some loss of hygroscopic material. The extent to which this loss takes place will vary with different conditions. To obtain a product of predeterminable properties, the amount of hygroscopic material contained in the product should be uniform, and this uniformity is usually most easily attained by adding the hygroscopic material after processing. In some cases, however, part may be incorporated before processing and part after processing. The hygroscopic material should be uniformly distributed throughout the lining material and the moisture content may be maintained at any desired predetermined level by varying the relative amount of hygroscopic material used. Examples of suitable hygroscopic materials which may be employed are organic materials such as glycerine, glucose, ethylene glycol and diethylene glycol or inorganic materials such as calcium chloride, magnesium chloride and sodium nitrate, preferably in finely-divided form. The hygroscopic materials may be employed in amounts varying from 10 to 50% on the weight of the regenerated cellulose but more or less may be incorporated, as stated, depending upon the moisture content desired. Preferably, the moisture content is maintained at from 25 to 50% by weight.

To enable the regenerated cellulose particles to be molded to a compact and resilient sheet or rod from which the discs may be punched or cut, the particles are held together by a suitable binding agent. The binding agent may be a glue, preferably water resistant, such as casein glue, animal glue or vegetable glue, it may be a derivative of cellulose, such as cellulose acetate, or a resin or gum applied with a volatile solvent in the form of a solution, or applied as a powder mixed with the regenerated cellulose and then wetted with a solvent to cause it to bind the particles, or it may be an inorganic binding agent such as, for example, sodium silicate. In some cases it is desirable to employ a binding agent such as a natural or synthetic thermoplastic or thermosetting resin or gum in powder form, and, after mixing the powder with the regenerated cellulose, subjecting the mixture to a molding operation under the action of heat and pressure. Examples of suitable synthetic resins are phenol-formaldehyde products, cumarone resins, glyptal resins, polymerization products of vinyl compounds, and the like, while suitable natural resins are colophony, balsam, copaiba, dammar, elemi and mastic. The binding agent may be employed in an amount ranging preferably from 10 to 20% on the weight of the regenerated cellulose particles. Such amount is sufficient to bind the particles but does not cause any undesirable loss of resiliency. It has been found that in some cases where high pressures, or large quantities of some adhesives, particularly cellulose acetate, are used, that the resiliency of the material is increased by treating the material with sufficient saponifying materials to convert the binder to regenerated cellulose. It is apparent in such a case that the hygroscopic material must be added at the end of processing since the treatment would otherwise remove most of the hygroscopic material.

During the molding operation, by means of which the regenerated cellulose particles are compacted and given the desired firm and resilient structure, the mixture, containing the binding agent and the hygroscopic material, may be subjected to pressures of from 5 to 5,000 pounds per square inch, with or without the application of heat, depending on the nature of the binding agent employed. Preferably, when cold-molding, pressures of about 3,000 pounds per square inch are employed. When molding the particles with the application of heat, temperatures of from 60 to 120° C. and pressures of from 5 to 1,000 pounds per square inch may be employed.

While the lining material may be molded into sheets of the desired thickness from which the discs may be punched, or the discs may be molded individually, we preferably mold the regenerated cellulose into a rod or cylinder of the desired diameter and discs of any desired thickness may be sliced or cut from the compacted cylinder. The sheets and cylinders may be made by compression molding or the latter may be stuffed or extruded under pressure through a nozzle of the desired diameter.

In order further to illustrate our invention but without being limited thereto the following examples are given:

Example I 400 parts by weight of cellulose acetate having an acetyl value of 54 (calculated as acetic acid) is ground until it is of 20 to 30 mesh fineness and the particles are then treated with 1600 parts of a 10% aqueous solution of sodium hydroxide at a temperature of 60° C. for 2 hours. After the saponification, the regenerated cellulose is washed neutral and dried.

100 parts by weight of this dry, regenerated cellulose is then mixed with 50 parts by weight of a mixture of equal parts by weight of water and glycerine and to this mixture is added 75 parts by weight of a 20% solution of cellulose acetate in acetone. The wet mixture is then cold-molded into the shape of a cylindrical rod under a pressure of 3,000 pounds per square inch. The rod is removed from the mold and sliced into discs 0.09 inch in thickness. The discs are then inserted into metal closures of the cap type and the face of the disc covered with an unplasticized cellulose acetate film .005 inch in thickness. The closures are then applied to bottles holding a carbonated beverage by means of a capping device. After being sealed the bottles are then subjected to a pasteurization treatment during which the internal pressure rises from the usual 35 pounds per square inch to 100 pounds per square inch. On cooling, the pressure returns to 35 pounds per square inch and remains there. The seal formed by the regenerated cellulose disc remains permanently tight, and there is no loss in pressure due to the escape of gas.

Example II 100 parts by weight of regenerated cellulose obtained in a manner analogous to that in Example I are mixed with 50 parts by weight of a solution of cellulose acetate in acetone. Sufficient quantity of this mixture is placed in a mold at 125° C. for 30 minutes under a pressure of 100 pounds per square inch to yield a blank 0.08 inch in thickness. The resulting sheet is then saponified in 130 parts by weight of 2.5% sodium hydroxide solution for 2 hours at the boil, washed free from excess caustic and dried. The sheet is then treated with an equivalent of its final dry weight of diethylene glycol-water mixture (50%/50% by weight) and punched into discs of suitable size for closures. A film of unplasticized cellulose acetate is then affixed by small spots of cellulose acetate-acetone solution and the resulting cushion liner inserted in a bottle cap. The seal obtained when employing the cushion liner prepared in this way is permanently tight to gas and liquid.

It is to be understood that the foregoing detailed description is given merely by way of illustration and that many variations may be made therein without departing from the spirit of our invention.

Having described our invention, what we desire to secure by Letters Patent is:

A compact, resilient material comprising discrete, non-fibrous and cellular particles of regenerated cellulose united by means of a binding agent comprising cellulose acetate and having incorporated therewith a hygroscopic material comprising glycerine.

GEORGE SCHNEIDER.
MERVIN E. MARTIN.